Figure 1:
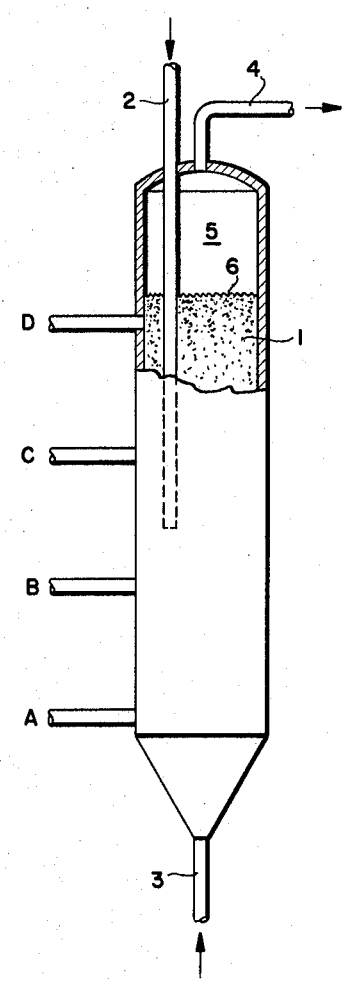

May 17, 1966   G. B. JOLLEY   3,251,677
FLUID BED PROCESS
Filed April 19, 1963   2 Sheets-Sheet 1

Gordon Byron Jolley   INVENTOR

BY *Perry Carvellas*

PATENT ATTORNEY

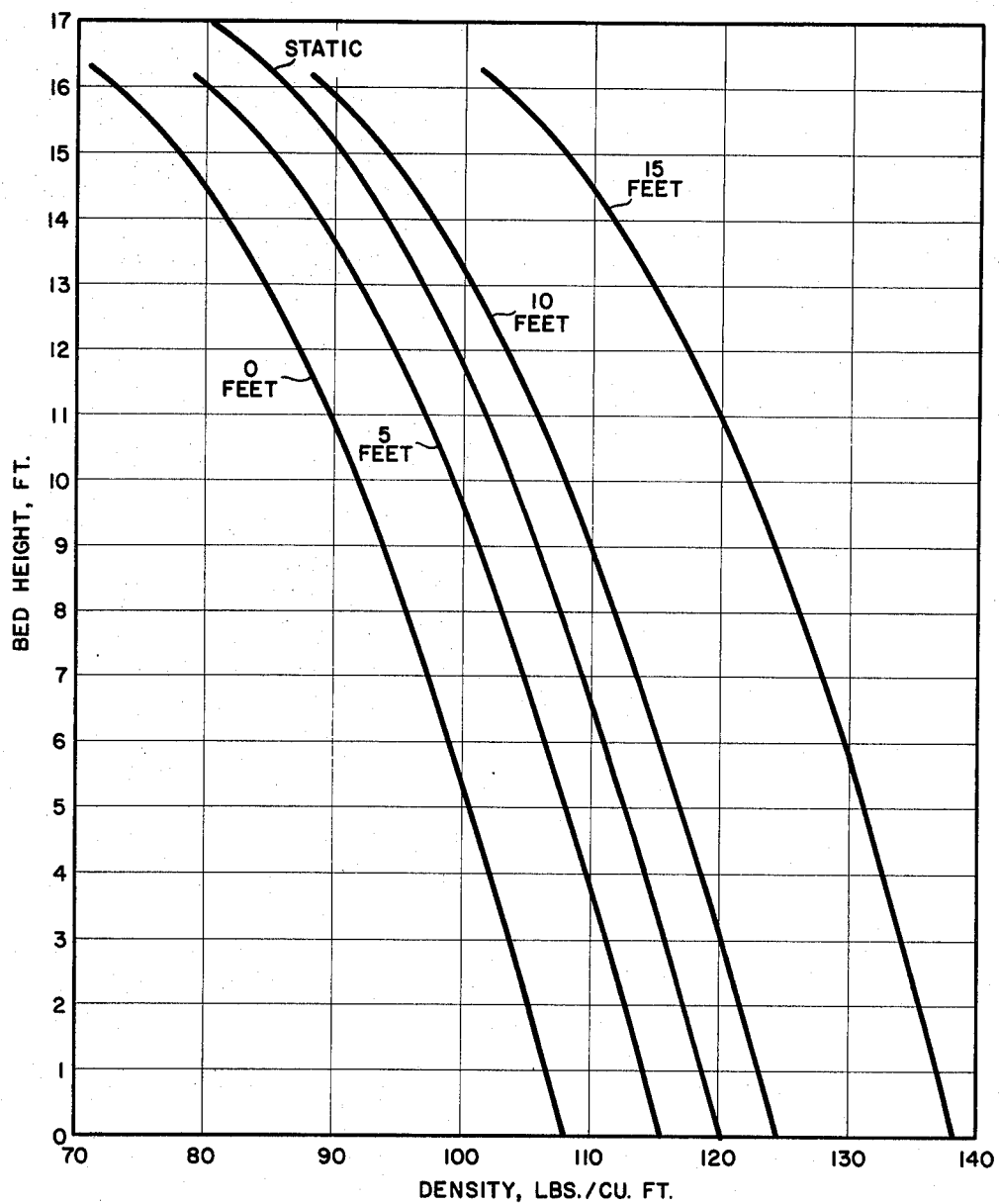

3,251,677
FLUID BED PROCESS
Gordon Byron Jolley, Baton Rouge, La., assignor to Esso
Research and Engineering Company, a corporation of
Delaware
Filed Apr. 19, 1963, Ser. No. 274,233
12 Claims. (Cl. 75—26)

This invention relates to a method of controlling fluid bed reactions. Further, this invention relates to a process of controlling the average density and particle size distribution in a fluidized bed of particles. Specifically, this invention relates to a method of improving gas solids contacting and controlling the fines concentration in a fluidized bed containing finely divided particles of different size distribution by varying the level in the bed of the point of withdrawing solids from the bed.

A specific application of this invention relates to a method of controlling the fines concentration, gas contacting, and efficiency of reducing iron ore in a direct iron ore reduction process carried out in a fluidized bed of finely divided iron ore particles which are contacted with a reducing gas.

The charge to be fluidized is prepared by grinding and screening, or like methods, to obtain a particle size distribution favorable to fluidization. The particles to be fluidized may undergo reaction themselves, may be inert heat transfer agents, or may be catalyst which act on gases with which they are in contact. Many variables are involved in obtaining good fluid gas solids contacting in a fluidized bed. It is well known in the art how a fluidized bed of finely divided solids can be obtained by varying the size of the particles to be contacted with the fluidizing gas, and by varying the density and velocity of the fluidizing gas. However, within the range of conditions in which a fluid bed is obtained, a great deal of difficulty has been experienced in obtaining good gas solids contacting and a high reaction efficiency. The efficiency of the reaction referred to can be that of the gas undergoing reaction or a solid undergoing reaction, or even the efficiency of heat exchange between inert solids and hot or cold gases. It is found that it is not sufficient merely to have a fluid bed to obtain an efficient operation.

It is found that the presence of fines within the fluidized bed tend to fill and lubricate the gas voids between larger particles and that some fines aid in the efficiency of gas solids contacting; however, too many fines disrupt the gas solids contacting and if either too many fines or too few fines are present, defluidization and bogging of a bed can occur. An efficient method for obtaining and controlling the percentage of fines present in a fluidized bed would be highly desirable. Controlling the fines concentration, however, is difficult in that in many fluidized bed reactions the fluid particles, themselves, tend to attrite and form more fines and thereby increase the concentration of fines present in the bed. Further, depending on the contacting which is carried out, fines may agglomerate and form larger particles reducing the concentration of fines present and tend to defluidize the bed. Another factor which affects the concentration of the bed, depending on the velocity of the fluidizing gas, fine particles which are relatively light in weight may be entrained and carried out of the fluid bed and out of the top of the reactor and thus be lost to the operation, thereby diluting the concentration of fines in the bed and again upsetting the fines-large particle relationship. Therefore, grinding the feed to a fluid bed operation to obtain the desirable particle size distribution is not sufficient to maintain the proper fine concentration in a fluidized bed operation. In addition where the particles that are fluidized are also undergoing chemical reactions, the chemical reactions may cause an increase or decrease in particle size or density, which increase or decrease can also upset the relationship of fine particles to larger particles in the bed.

In some types of fluidized bed operations, such as the reduction of oxidized materials, the particles undergo extreme changes in size and shape, including growth of particles, agglomeration of fine particles into larger particles, and attrition or larger particles into smaller particles. Classification of the particles in the fluidized bed takes place and the larger and heavier particles migrate downwardly and the lighter and smaller particles migrate to the top of the bed. This effect is called elutriation, which amounts to a classification of the particles in the fluidized bed according to their size and weight.

A factor in avoiding agglomeration of fines at a given temperature is the fluidizing gas velocity in the contacting zone. With high fluidizing gas velocities, the fluidized material has a lesser tendency to stick at a given temperature level. A factor affecting the economics of fluid bed reduction of iron ores is to provide conditions suitable for treating economically ores having a wide range of particle sizes.

In the fluid bed reduction of iron ore, the tendency to stick and agglomerate and cause defluidization in the fluid bed is most prevalent in the ferrous reduction zone, i.e. where FeO is reduced to Fe. Normally, in the reduction zones at the higher state of oxidation of the iron, for example, the $Fe_2O_3$ and the $Fe_3O_4$ zones, agglomeration, bogging, and defluidization of the fluid bed are not a problem under normal operating conditions.

It is not possible to control the fine concentration in a fluid bed operation by carefully grinding and classifying the feed to the reducing zone because during reduction there is a considerable amount of attrition, making more fines, some agglomeration wherein very fine material forms agglomerates and larger particles, and there is a change in density of the oxide as it is reduced to metallic iron. These things take place continuously in the fluid bed affecting the particle size of the particles undergoing fluidization, and affecting the efficiency of gas solids contacting and the degree of metallization which can take place in the fluid bed reaction zone under any particular set of fluidizing conditions.

In accordance with the present invention, applicant has unexpectedly found that the fines concentration, degree of efficiency of gas solids contacting in a fluidized bed, and the average density of the particles in the fluidized bed could be easily and continuously controlled by varying the point of withdrawal in the fluidized bed of the solids materials.

Applicant found, when fluidizing a bed of finely divided solids containing particles of wide size distribution, that the smaller particles due to being lighter were buoyed up and lifted and concentrated near the top of the fluid bed and the heavier particles being heavier and buoyed less, more or less settled near the bottom of the fluid bed. This provided from top to bottom of the bed a pressure gradient related to the density of the particles in the different portions of the bed. Applicant unexpectedly found that by withdrawing solids from different levels in this bed, he could shift the pressure gradient which was related to the density of the particles in the bed either to a point higher or lower in the bed. Applicant found, for example, that if the point of solids withdrawal from the bed was taken at the top that the withdrawn material would have a higher concentration of fines in the withdrawn solids until equilibrated after which time the withdrawn material would have the same average particle size composition as the feed. However, this would shift the density-pressure relationship of the solids in the bed upward so that the entire bed would, on the average, become more dense. The term density refers to the apparent density of the solids in the fluid bed. On the other hand, if the point of withdrawal was moved to the bottom of the bed and solids withdrawn until the bed was equilibrated the withdrawn material would have a higher concentration of heavier particles than the feed. However, after the bed had become equilibrated, the withdrawn material would again have about the same average composition of particle sizes as the feed material and then the whole fluidized bed would have a lower average density than it did before the point of withdrawal was shifted downward.

The fluid bed operation, for example, is widely employed in the catalytic cracking art in the production of synethetic fuel by catalytic reaction and in the reduction of iron ore. In the fluid bed operation the gas velocity is co-related with the particle size and density of solid materials so as to maintain the finely divided solids in a dense turbulent state simulating a boiling liquid. The finely divided solids undergo extensive vertical and horizontal motion and assume a pesudo liquid level. The technique for fluidizing a bed of finely divided solids is broadly known in the art and does not form a part of the present invention. Maintaining the fluidized bed in such a manner as to obtain maximum efficient contacting between gas and solids, however, is the present invention.

In accordance with the present invention, the particles to be fluidized are ground to a size at which they can be fluidized with the gas they are to be contacted with. The particles may vary in size from relatively large to finely powdered materials. The actual size of the particles which are treated will depend on the density and viscosity of the gas with which they are to be contacted. The particles to be fluidized are generally of random size distribution, and the ratio of the amount of each size particle to particles of other sizes in the fluid bed will vary depending on the type of materials involved. However, there is a sufficient number of particles smaller than the size of the average larger size particles so that on fluidization, due to their lighter weight, they have a tendency to be buoyed up and migrate to the top of the fluid bed, and the heavy particles tend to migrate to the bottom of the bed. This tendency is called elutriation. The velocity of the fluidizing gas is sufficient to lift up and buoy up the particles in such a manner that they are fluidized and the fluidized particles appear to take on the characteristics of a fluid. The fluidizing gas will vary in density with the material being fluidized in which solids and gases it is intended to bring into contact. Generally, very finely divided solids would require a relatively less dense, less viscous fluidizing gas and relatively large solids would require a more dense and more viscous fluidizing gas. Inert gases which have the proper density and viscosity can be blended with a particular reacting gas which is to be contacted with the solids in order to obtain a gas that will efficiently carry out the fluidization.

The pressure at which the fluidization is carried out is not critical to the present invention; however, by increasing the pressure of the fluid bed operation, the gases become more dense and may, in effect, be more efficient to carry out the fluidization. Also, increases in pressure will bring into contact with a particular solid particle more of a reacting gas and thus possibly increase the rate of reaction between gas and solids. Also, depending on the products of a chemical reaction in contact with the gas and solids, pressure may affect the chemical equilibrium. Temperature is not critical to applicant's invention, and any temperature which will efficiently carry out the desired reaction can be used.

Where particles of wide size distribution are fluidized, elutriation of the small particles as previously described toward the top of the bed will cause an apparent density gradient in the fluidized bed of solids from the top to the bottom of the bed, and by varying the point of withdrawal in the height of the fluid bed of the solids this apparent density gradient can be altered. Altering the density gradient also has the effect of varying the fines concentration in the entire fluid bed. This technique will therefore provide a means for varying the apparent density gradient and adjusting the fines concentration in the fluidized bed within certain ranges to obtain the maximum efficient gas solids contacting and therefore optimize any fluidized bed reaction.

In a specific embodiment of the present invention, iron ore is reduced in a fluidized bed reaction zone to metallic iron. Preferably, the iron ore is reduced in two stages wherein the raw iron ore is reduced from $Fe_2O_3$ to substantially FeO and the FeO is then reduced from FeO to about 70 to 95% metallic iron. As previously stated, the problems of agglomeration and sintering and inefficient gas solids contacting are not encountered to large degree in the $Fe_2O_3$-FeO reduction zones. However, in the FeO-Fe reduction zone, sintering, agglomeration, defluidization, and bogging of the bed are major problems, and the problems are accentuated as the degree of metallization increases. Applicant has found that these problems can be overcome by varying the level of withdrawal from the fluid bed in the ferrous reduction zone and thus controlling the average fines concentration in the bed to obtain maximum gas solids contacting efficiency.

FIGURE 1 of the drawings is a schematic representation of a fluid bed reduction zone having four different points of solids withdrawal from the fluid bed.

FIGURE 2 is a graph showing the apparent density gradient existing in the fluidized bed and how the density gradient can be shifted by varying the point of withdrawal of solids from the fluid bed.

Figure 3:
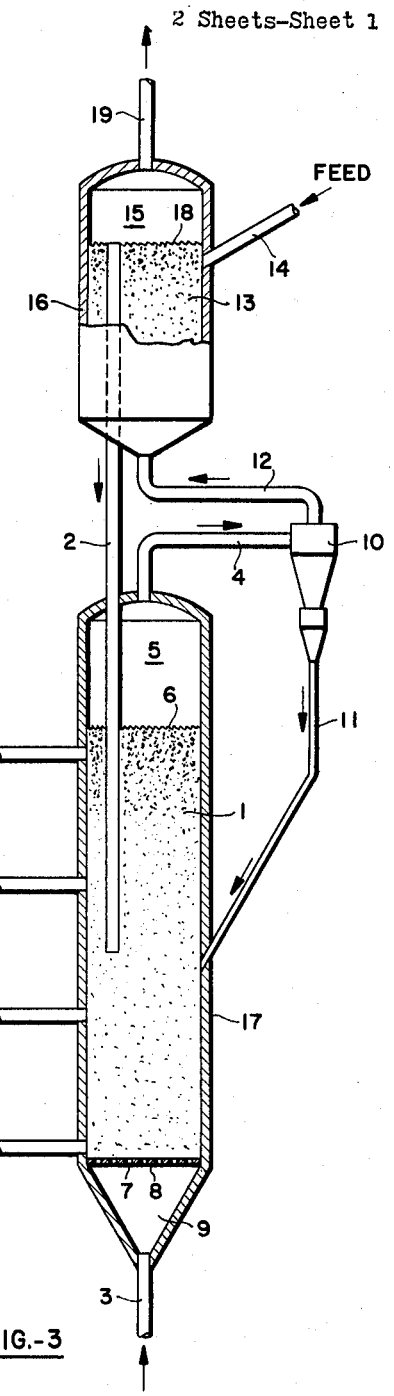

FIGURE 3 of the drawings is a schematic representation of a two-step direct iron ore reduction method carried out in accordance with the present invention.

The principal variables involved in a fluid bed reaction are the size of particles which are fluidized and the fluidizing gas. The particle size distribution of the solids that are contacted with the gas are such that the smaller, lighter particles are elutriated and tend to concentrate in the upper portion of the bed and the larger, heavier particles tend to settle in the bottom of the fluid bed. The technique used in the present invention relates to any fluidized or fluidizable solids wherein the particle size is such that, when fluidized, elutriation occurs and a density gradient is established in the bed. Obviously, any attrition of the particles or aggregates formed by agglomeration of very fine particles which takes place in the bed which would change the relationship of coarse to fine particles as introduced to the bed would affect the efficiency of contacting and change the conditions needed to obtain the maximum efficient contacting in a fluid bed. The discussion of the solid particles in the present invention will be directed to finely divided particles of, for example, 10 to 3000 microns in size, though particles larger and smaller than this can be handled by the present technique. The solids which can be treated within the scope of this invention are catalysts, inert solids, and solids which undergo chemical reactions themselves. Gases which may be used in accordance with the present invention are inert gases which can be used for heat transfer, gases which are used primarily to fluidize the solids particles, gases which themselves undergo chemical reactions, or gases which cause the solids to undergo chemical reactions. For example, solid particles may be catalytic particles used in fluid catalytic cracking; gases undergoing chemical reaction may be heavy hydrocarbons which are cracked to lighter chemical products; solid particles which undergo chemical reactions may be metal oxides which are reduced to metals; and gases which reacted with these may be reducing gases which are in turn oxidized, for example, hydrogen or carbon monoxide and hydrogen which would reduce metallic oxides and in reducing metallic oxides would be oxidized to water and carbon dioxide, respectively.

In order to better understand the description of the invention which follows, the relationship between particle size described by mesh, inches, and microns is provided in Table I below.

Table I

| Mesh | Inches | Microns |
|------|--------|---------|
| 400 | 0.0015 | 37 |
| 325 | 0.0017 | 44 |
| 200 | 0.0029 | 74 |
| 150 | 0.0041 | 105 |
| 100 | 0.0059 | 149 |
| 65 | 0.0083 | 210 |
| 48 | 0.0117 | 297 |
| 28 | -------- | 589 |
| 14 | -------- | 1,168 |
| 8 | -------- | 2,362 |
| 4 | -------- | 4,699 |

The above table shows the relationship between particle size as described by mesh, in inches and in microns.

The invention will be better understood by the following description. Referring to FIGURE 1 of the drawings, in accordance with a preferred embodiment of the invention a suitable vessel is used of about 5 to 100 feet in height and of about 1 foot to 30 feet in diameter wherein the top of the fluid bed in the vessel can be 1 foot to 30 feet below the top of the vessel. Solid particles are fed to vessel 1 through line 2 and have a range of particle size of 12,000µ to <1µ and a random particle size distribution. Particles are introduced into vessel 1, at which time a fluidizing gas is introduced into bed 1 at a superficial velocity of 0.2 to 6 ft./sec. and a pressure of about <1 to 30 atm. The gas fluidizes the solid particles in bed 1, raising the height of the bed to about level 6. Fluidizing gas is introduced in such a manner that the percentage of fines that passes out of the top of the bed into chamber 5 and that is withdrawn through line 4 is minimized. However, under conditions where a fluid bed reaction is carried out where the percentage of fines removed is substantial, these fines can be separated from the gases by suitable means and returned to fluid bed 1. The temperature at which the fluid bed contacting is carried out may range up to about 2200° F. and is generally not critical except where a particular reaction is carried out in the bed where temperature is an important feature of the reaction.

To obtain a better understanding of the invention, what occurs in a fluidized bed prior to withdrawal of any solids from the bed will be described. Solids are introduced into bed 1 and then the solids introduction is stopped and the bed is fluidized until a level 6 is obtained. At these static conditions of fluidization, i.e. no further addition of solids and no withdrawal of solids, the particles in the fluid bed will elutriate and the fine particles will tend to concentrate at the top of the bed and the heavy particles will tend to concentrate at the bottom of the bed. The degree of concentration variation by particle size will be dependent almost entirely on the relative particle size and the particle size distribution of the small and large particles in the bed. A density gradient would be established in the bed which will be closely related to the particle size distribution of the feed.

If solids are now removed from point A in the vessel and an equal amount of solids continuously fed through line 2, the solids initially withdrawn through point A will have a very high concentration of the heavier particles of the feed material. The solids removed from point A after equilibration will have the same average concentration and particle size distribution as the feed introduced through line 2. This is ignoring any increase in fines concentration due to attrition, and any decrease in fines concentration due to agglomeration which would affect the particle size distribution of the withdrawn material to a certain extent. The average density of the material remaining in the fluid bed will be less dense than the feed introduced through line 2. This in effect increases the overall fines concentration in the fluid bed and makes the solids in the fluid bed above point A less dense on the average than the feed.

If the withdrawal of solids through line A is stopped and solids are now withdrawn through line B, after the solids have equilibrated, the solids withdrawn through line B will have the same particle size distribution as the solids in the feed introduced through line 2 and also the same fines concentration as the feed. The solids in the fluid bed below point B will have a higher density than the feed and the solids above B will have a lower density than the feed. If solids withdrawal from point B is stopped and the solids are now withdrawn from point C, then the solids withdrawn from point C after equilibration will come to have the same particle size distribution as the feed and solids below point C will have a higher density than the solids withdrawn through point C, i.e. the feed, and solids above point C will have a lower density than solids withdrawn through point C. And lastly, if the solids are withdrawn from point D, the fluid bed of solids after becoming equilibrated will have a higher density than the solids in the feed. The overall fines concentration in the bed will be less than in the feed, and the concentration of fines in the withdrawn material will be the same as in the feed.

In effect, when solids are removed from points A and B you remove relatively more of the coarse or larger particles than the fine particles and the overall fines concentration in the fluidized bed increases. On the other hand, if you remove solids from points C and D, you tend to remove relatively more fines from the fluidized bed than large particles and the overall fines concentration decreases and the average density of the materials remaining in the fluidized bed increases.

Accurate efficient control of the average density of the bed and the overall fines concentration, which directly effect efficiency of gas solids contacting, can be obtained by controlling the amount of solids removed from any points A, B, C, or D, or by varying the amounts removed from any two or more points to obtain maximum gas solids contacting and maximum efficiency of reaction carried out in the fluid bed reaction zone.

In a specific application of the present invention, referring to FIGURE 3 of the drawing, iron oxides are reduced to metallic iron in a two-stage fluid bed reactor. Iron ore feed is reduced in beds 13 and 1 which beds are housed in vessels 16 and 17, respectively, which vessels can be of any conventional construction wherein ascending gas currents can maintain beds of finely divided solids in a fluidized state. The two beds can be housed in either a common vessel appropriately partitioned and staged or in separate vessels. Finely divided iron oxide starting material is fed continuously to the primary reactor vessel 16 wherein it is reduced to an intermediate product which consists substantially of FeO and contains only minor amounts of higher oxides of occasionally metallic iron. The iron ore fed to vessel 16 through line 14 forms level 18 in bed 13. The iron ore is first ground to a particle size of 4 to −325 wherein the iron oxide particles are of random size distribution. The fluidizing gas is introduced into bed 13 through line 12 at a velocity of 1.5 to 5 ft./sec., preferably 2 to 3 ft./sec., and fluidizes the iron ore particles in bed 13 maintaining a fluidized bed. As the ore is introduced through line 14 and is reduced to FeO, it overflows downcomer 2 and the partially reduced product of bed 13 thus constitutes the feed to vessel 17.

Off gases from the bed 13 enter chamber 15 and are withdrawn through line 19. Any entrained solids in these off gases are removed by conventional solids gas separator, not shown. The FeO feed into zone 1 is then reduced substantially to metallic iron. The fluidizing gas can be either hydrogen or a mixture of hydrogen and carbon monoxide, and the density of fluidizing gas can be adjusted by adding an inert gas such as nitrogen so the desirable degree of fluidization can be obtained. The pressure in the reactor is not particularly critical but some advantages are obtained in the reduction reaction by operating at elevated pressures. The temperature in each of the beds 1 and 13 will vary depending on the reducing gas but can generally be 1000 to 1800° F. and more preferably about 1200 to 1400° F.

The conditions of fluidization in bed 1 are critical. The apparent overall density of the solids in bed 1 can be about 80 to 130 lbs./ft.$^3$ and preferably about 100 to 120 lbs./ft.$^3$. The degree of metallization effected in bed 1 can be 60 to 100% and preferably about 80 to 95%. The degree of metallization is a critical factor on the amount of agglomeration of fines that occurs in the bed and the tendency of the fluidized bed to plug, bog, and refluidize. The residence time of these solids in bed 1 can be about 1 to 20 hours and preferably about 2 to 10 hours.

Fluidizing gases are introduced into vessel 17 and bed 1 through line 3, gas chamber 9, openings 7, of grid 8 to fluidize the solids in bed 1. The iron ore being reduced from iron oxide to metallic iron undergoes a considerable amount of attrition, making smaller particles, and some sintering and agglomeration of small particles to make larger particles. Therefore, efficient control of the fines in the ferrous reduction zone by adjusting the fines in the feed to this zone is not possible.

Fluidizing gases passing up through bed 1 and into chamber 5 contain some very fine particles which are entrained with the gas and taken through line 4 into gas solids separator 10 where the fines are separated from the gases and these fines returned through line 11 to bed 1. The fines free gases are taken overhead through line 12 and introduced into bed 13 as a fluidizing gas as previously described. By varying the point of reduced iron solids withdrawal from points E, F, G, and H, applicant is able to vary the overall fines concentration in bed 1. The efficiency of gas-solids contacting is improved and a more efficient reduction of iron ore to metallic iron without agglomeration, bogging, and defluidization is obtained.

Withdrawal of solids through point H tends to increase the overall fines concentration in the bed and withdrawal of fines through point G tends to decrease the overall concentration of fines in the bed. Withdrawal from points F or E will have an effect somewhere between the other effects. Partial withdrawal of solids from any two points would give close control of the overall fines concentration. This method of control of fines concentrations provides a great deal of flexibility and better control than heretofore has been possible and gives more flexibility in the use of temperatures and fluidizing gas velocities than was heretofore possible. The technique takes into account attrition and agglomeration of particles. Overall fines concentration in the fluid bed can be determined by either pressure or density measurements within the fluid bed.

The process of this invention is further illustrated by the following examples which demonstrates its use in both large and small scale units for efficient gas solids contacting and for the production of iron from iron ore.

EXAMPLE I

To illustrate the invention with reference to FIGURES 1 and 2 of the drawings a cylindrical vessel of 20 feet in height and having a diameter of 2 feet was filled with particles having a particle size in the range of 4 to −325 mesh of random size distribution, nitrogen gas having a density of 0.10 lb./ft.$^3$ was used to fluidize inert particles at a superficial gas velocity of 3 ft./sec. Pressure in the contacting vessel was about atmospheric pressure and temperature was about 80° F. In order to show the effect on apparent density gradient of the solids in the bed, the following was carried out. The solids were introduced into bed 1 until a bed level of less than 15 ft. was reached and the solids feed was stopped. Fluidizing gas was introduced into the vessel, fluidizing the solids in the vessel, and gradually raising the level until a bed height of 15 ft. was reached. The solids were fluidized and it was found that elutriation of the solids according to particle size took place. Under these static conditions of fluidization, the apparent density gradient of the solids in the bed was as shown in FIGURE 2 as the line static. Due to the elutriation effect the solids in the bed had tended to separate into heavy and fine particles or coarse and fine particles with the fine particles migrating toward the top of the bed and the heavy particles migrating toward the bottom of the bed in accordance with particle size distribution. Density measurements made at the indicated bed heights would show the indicated apparent densities, refer to FIGURE 2.

At this point feed is introduced through line 2 and solids withdrawn at about the same rate through line A at about 0 ft. bed height. Initially, the withdrawn solids through line A contain a high proportion of coarse particles. After a suitable length of time it is found that the solids withdrawn through pipe A will contain the same average composition and particle size distribution as the solids introduced through line 2, and that the apparent density gradient of the bed had shifted to that illustrated by the line labeled 0 ft. This shows that the apparent density of the solids in the bed is decreased and the overall fines concentration increased. The withdrawal through point A is stopped and the solids are then withdrawn through point B at 5 ft. in bed height and then allowed to come to equilibrium. Initially the solids withdrawn through point B are somewhat less coarse in particle size than those withdrawn through point A but more coarse than the feed. After the solids are allowed to come to equilibrium it is found that the density gradient shifts to the right as indicated by line labeled 5 ft. in FIGURE 2. The solids are then removed from lines C and D in that order, at 10 ft. and 15 ft. of bed height respectively, and each allowed to come to equilibrium and the density gradient measured and is shifted as shown in FIGURE 2 of the drawings by the lines labeled 10 ft. and 15 ft.

Generally it can be said that by withdrawing solids continuously from the bottom of the bed that the overall fines concentration in the bed will be increased above that of the feed. On the other hand, withdrawing solids from the upper portion of the bed, for example, from point D, it is found that the overall fines concentration in the bed is decreased below that of the concentration in the feed. Withdrawal of solids from any point intermediate A and D or partially from two or more points can be used to obtain accurate efficient control of the fines concentration in the bed and the average apparent density of the solid particles in the bed thus obtaining optimum gas solids contacting and efficient reaction of any materials contacted in the bed. Table II below, illustrates the relationship between bed density and bed height and how the relationship is affected by varying the point of solids withdrawal.

*Table II*

AVERAGE DENSITY AT VARIOUS LEVELS WHEN SOLIDS ARE WITHDRAWN FROM POINTS INDICATED

| Point of solids withdrawal | A | B | Static | C | D |
|---|---|---|---|---|---|
| 0 Ft. | 108 | 115 | 120 | 124 | 139 |
| 5 Ft. | 101 | 108 | 113 | 117 | 131 |
| 10 Ft. | 92 | 98 | 108 | 108 | 122 |
| 15 Ft. | 78 | 85 | 90 | 94 | 108 |
| Percent of −325 mesh particles in entire bed. | >10 | >10 | 10 | <10 | <10 |

EXAMPLE II

In a 2 ft. diameter vessel having a height of about 20 ft. and a fluidized bed height level of 15 ft. iron ore consisting substantially of FeO was contacted in countercurrent direct contact with a fluidizing gas consisting essentially of $CO+H_2$ and reduced to essentially Fe. The superficial gas velocity of the fluidizing reducing gas was about 2 to 3 ft./sec. and the particle size of the partially reduced iron ore undergoing reduction was 4 to —325 mesh. The feed to be reduced had the initial particle size distribution indicated below in Table III.

*Table III*

| Screen mesh: | Percent solids on screen |
|---|---|
| 4 | ---- |
| 14 | 21.24 |
| 28 | 15.74 |
| 48 | 13.54 |
| 100 | 13.69 |
| 200 | 13.31 |
| 325 | 12.48 |
| Pan | 10.00 |

The overall fines concentration in the fluid bed had an important effect on metallization and gas utilization as illustrated below in Table IV.

*Table IV*

FERROUS REDUCER

| Fines conc. as percent solids through 325 mesh | 1 | 5 | 9 |
|---|---|---|---|
| Product rate, tons/day | | 4.2 | |
| Temperature, °F | | 1,390 | |
| Percent metallization | 61 | 70 | 80 |
| Gas utilization [1] | 40 | 53 | 62 |
| Apparent density at 0.5 to 4.5 ft. bed height in lb./ft.³ | 130–140 | 100–120 | 90–110 |
| Apparent density at 4.5 to 15 ft. bed height | 120–130 | 90–100 | 80–90 |

[1] Gas reacted with ore plus gas required by equil.
Gas available for reaction

The above table clearly shows that at the same conditions of fluidization utilizing the same fluidizing gas in a fluidized bed of 15 ft. and 2 ft. in diameter with a product rate of 4.2 tons/day and a reduction temperature of 1390° F. where the fines concentration was varied between 1 and 9% fines in the partially reduced ore that the percent metallization varied between 61 and 80% and the percent of gas utilization, i.e., gas solids contacting efficiency results in the gas utilization of 40 to 62%. The above data clearly show that optimization of reduction conditions can be obtained by controlling the fines concentration in the bed and that the fines concentration can be controlled by varying the point of withdrawal of product from the ferrous reducing zone. The fines concentration can be determined by direct measurement of the apparent fluid bed density and the point and amount of solids withdrawal determined accordingly.

Due to the attrition of the ore undergoing reduction the percentage of fines present in the ferrous reduction zone cannot be controlled by the percentage of fines introduced with the feed. For example, a feed consisting of particle sizes varying between 4 and —325 mesh and having 10% of particles less than about —325 mesh will after undergoing direct iron ore reduction in the ferrous zone contain, due primarily to attrition, 40 to 50% of particles under —325 mesh. It was found that when the ferrous reducing zone contained a fines concentration of about 30 to 40% of materials under —325 mesh that the bed bogged and defluidized and reduction could not be carried out. The concentration of particles in the fluidized bed of ferrous oxide of minus 325 mesh, i.e., 325 mesh and finer, can, however, be readily maintained at about 5 to 20% by withdrawal of fines, and, when this is done, the process can be operated smoothly and efficiently.

From the foregoing description it can be seen that the invention affords a simple, efficient manner of controlling the fines concentration and apparent density gradient of the material undergoing the fluidized bed operation. The invention overcomes the necessity of depending on finely grinding the feed to a fluidized bed operation, and the requirements of depending upon a cyclone gas solids separator to remove fines and to return all or part of the fines to the fluid bed reaction zone.

The above described technique provides a simple efficient means of operating a fluid bed gas solids contacting zone so that maximum efficient contacting and reaction of the reactants can be obtained. Applicant's technique for controlling the particle size distribution in the fluidized bed has application throughout chemical and petroleum processing fields where chemical reactions are carried out in fluid beds or where solids are reacted in fluid beds.

Obviously many other modifications and variations of the invention as above set forth may be made without departing from the spirit and scope thereof and therefore only such limitations should be imposed as are indicated in the appended claims.

What is claimed is:

1. In a process wherein iron oxides solids particles are fed into a bed, randomly distributed, fluidized by contact of the particles with upwardly flowing gases, and reduced substantially to metallic iron at temperatures ranging from about 1000–1800° F. the improvement for selectively controlling particle size distribution comprising withdrawing solids particles from a plurality of locations intermediate the surface level and bottom of the bed, at least one location being above the mid-point of the bed and another below the mid-point of the bed, the rate of withdrawal of the particles from any location providing at static equilibrium an average density and particle concentration in the withdrawn portion characteristic of the feed to the bed, maintaining from about 5 to 20% of the particle sizes of the bed in a range of from about 325 mesh and finer mesh to obtain the optimum and desired particle size concentration for greater efficiency of contact between gases and solids.

2. The process of claim 1 wherein the temperature ranges from about 1200 to 1400° F.

3. The process of claim 1 wherein the density of the bed is maintained at from about 80 to 130 lbs./ft.³.

4. The process of claim 1 wherein the density of the bed is maintained at from about 100 to 120 lbs./ft.³ while providing from about 80 to 95% metallization.

5. In a process wherein ferrous oxide solids particles are fed into a bed and randomly distributed, fluidized by contact of the particles with upwardly flowing gases consisting essentially of hydrogen and from about 0 to 60% carbon monoxide and reduced to produce metallization at temperatures ranging from about 1000–1800° F. the improvement for selectively controlling particle size comprising withdrawing solids particles from the bed from a location intermediate the surface level and bottom of the beds, and withdrawing said particles at a rate providing at static equilibrium an average density and particle concentration in the withdrawn portion characteristic of the feed to the bed, maintaining from about 5 to 20% of the particle sizes in a range of from about 325 mesh and finer mesh to obtain the optimum and desired particle size concentration for greater efficiency of contact between gases and solids.

6. The process of claim 5 wherein the solids particles are withdrawn from a location above the mid-point of the bed but below the upper level of the bed.

7. The process of claim 6 wherein the temperature ranges from about 1200 to 1400° F.

8. The process of claim 6 wherein the density of the bed is maintained at from about 80 to 130 lbs./ft.³.

9. The process of claim 6 wherein the degree of metallization of the reduced particles withdrawn from the reduction zone is above about 70%.

10. The process of claim 6 wherein the density of the bed is maintained at from about 100 to 120 lbs./ft.³ and metallization ranges from about 80 to 95%.

11. The process of claim 6 wherein the gas utilization in the reduction is above 50%.

12. The process of claim 6 wherein the concentration of particles of minus 325 mesh is greater in the withdrawn portion than in the feed.

References Cited by the Examiner

UNITED STATES PATENTS

| | | | |
|---|---|---|---|
| 2,561,396 | 7/1951 | Matheson | 75—26 X |
| 2,586,818 | 2/1952 | Harms. | |
| 2,711,368 | 6/1955 | Lewis | 75—26 |
| 2,821,471 | 1/1958 | Sellers | 75—26 |
| 2,848,316 | 8/1958 | Davis et al. | 75—26 |
| 2,864,688 | 12/1958 | Reed | 75—26 |
| 2,996,373 | 8/1961 | Agarwal | 75—26 |

FOREIGN PATENTS

| | | |
|---|---|---|
| 164,980 | 9/1955 | Australia. |
| 600,326 | 4/1948 | Great Britain. |

DAVID L. RECK, *Primary Examiner.*

BENJAMIN HENKIN, *Examiner.*